US009027941B2

(12) United States Patent
Cimino

(10) Patent No.: US 9,027,941 B2
(45) Date of Patent: May 12, 2015

(54) PORTABLE SHOPPING CART WITH COLLAPSIBLE BASKET AND SEATING FOR MULTIPLE CHILDREN

(76) Inventor: Lisette Cimino, Milford, PA (US)

( * ) Notice: Subject to any disclaimer, the term of this patent is extended or adjusted under 35 U.S.C. 154(b) by 0 days.

(21) Appl. No.: 13/584,247

(22) Filed: Aug. 13, 2012

(65) Prior Publication Data

US 2013/0038042 A1 Feb. 14, 2013

Related U.S. Application Data

(60) Provisional application No. 61/523,020, filed on Aug. 12, 2011.

(51) Int. Cl.
*B62B 3/02* (2006.01)
*B62B 3/10* (2006.01)
*B62B 3/14* (2006.01)
*B62B 7/00* (2006.01)

(52) U.S. Cl.
CPC . *B62B 3/027* (2013.01); *B62B 3/10* (2013.01); *B62B 3/144* (2013.01); *B62B 3/1452* (2013.01); *B62B 3/146* (2013.01); *B62B 3/1468* (2013.01); *B62B 3/1472* (2013.01); *B62B 7/008* (2013.01); *B62B 2203/02* (2013.01)

(58) Field of Classification Search
USPC .............. 280/47.35, 47.38, 33.993, 638, 639, 280/651, 657, 658, 47.34
See application file for complete search history.

(56) References Cited

U.S. PATENT DOCUMENTS

| | | | | |
|---|---|---|---|---|
| 2,420,088 A | * | 5/1947 | Milburn | 280/47.35 |
| 2,997,311 A | * | 8/1961 | Umanoff | 280/33.993 |
| 3,497,234 A | * | 2/1970 | Schray | 280/33.993 |
| 3,575,250 A | * | 4/1971 | Dykes | 180/11 |
| 5,312,122 A | | 5/1994 | Doty | |
| 5,544,904 A | * | 8/1996 | Maher | 280/47.35 |
| 5,823,548 A | * | 10/1998 | Reiland et al. | 280/33.993 |
| 5,882,021 A | * | 3/1999 | Reiland et al. | 280/33.993 |
| 6,270,093 B1 | * | 8/2001 | Johnson et al. | 280/33.993 |
| 6,318,392 B1 | * | 11/2001 | Chen | 135/67 |
| 6,328,329 B1 | | 12/2001 | Smith | |
| 6,364,326 B1 | * | 4/2002 | Reiland et al. | 280/33.993 |
| 6,513,817 B2 | * | 2/2003 | McCue et al. | 280/79.2 |
| 6,575,480 B2 | | 6/2003 | McKelvey | |
| 6,679,506 B2 | | 1/2004 | Koppes et al. | |
| 6,889,998 B2 | * | 5/2005 | Sterns et al. | 280/651 |
| 6,979,004 B2 | * | 12/2005 | Otterlee et al. | 280/33.993 |
| 7,080,844 B2 | * | 7/2006 | Espejo | 280/33.995 |
| 7,090,242 B1 | * | 8/2006 | Sheinall et al. | 280/657 |
| 7,093,841 B2 | | 8/2006 | Conrad | |
| 7,494,135 B2 | * | 2/2009 | Ash et al. | 280/33.991 |
| 7,644,937 B2 | * | 1/2010 | Giampavolo et al. | 280/33.991 |

(Continued)

*Primary Examiner* — Jeffrey J Restifo
*Assistant Examiner* — Erez Gurari
(74) *Attorney, Agent, or Firm* — Global Intellectual Property Agency, LLC

(57) ABSTRACT

A portable child-carrying shopping cart having a collapsible cart basket. The cart has a seat for two small children and seat belts for keeping children safely seated side-by-side. An extendable snack tray provides children with access to their own snacks and beverages, so that a parent does not have to maintain constant control of these items. Below the seat is an interior cavity with a coat hook and a space for storing bags, purses, and garments. On the opposing side of the body of the device, a cart basket is secured. The cart basket is expandable and collapsible. The device can be easily stowed when the basket is collapsed against the body. It can also be quickly expanded for use as a shopping cart when a parent is running errands.

14 Claims, 2 Drawing Sheets

(56) References Cited

U.S. PATENT DOCUMENTS

| | | | |
|---|---|---|---|
| D671,292 S * | 11/2012 | Long et al. .................. D34/27 |
| 2002/0020977 A1 * | 2/2002 | Johnson et al. ........ 280/33.993 |
| 2003/0184032 A1 * | 10/2003 | Otterlee et al. ........ 280/33.993 |
| 2006/0012138 A1 * | 1/2006 | Otterlee et al. ........ 280/33.993 |
| 2008/0012254 A1 * | 1/2008 | Giampavolo et al. .... 280/33.993 |
| 2008/0018068 A1 * | 1/2008 | Bartlett .................. 280/33.993 |
| 2008/0238011 A1 * | 10/2008 | Hammel et al. ............ 280/47.34 |
| 2008/0238012 A1 * | 10/2008 | Carter ...................... 280/47.35 |
| 2011/0304110 A1 * | 12/2011 | Long ...................... 280/33.992 |
| 2012/0319367 A1 * | 12/2012 | Hermosillo .............. 280/33.993 |
| 2012/0319371 A1 * | 12/2012 | Joubert .................... 280/47.35 |
| 2013/0020776 A1 * | 1/2013 | Taranto .................... 280/47.35 |
| 2013/0038032 A1 * | 2/2013 | Long et al. ................ 280/47.34 |
| 2013/0038042 A1 * | 2/2013 | Cimino ........................ 280/651 |
| 2013/0140778 A1 * | 6/2013 | Stauff et al. ............. 280/33.996 |

* cited by examiner

PORTABLE SHOPPING CART WITH COLLAPSIBLE BASKET AND SEATING FOR MULTIPLE CHILDREN

CROSS REFERENCE TO RELATED APPLICATION

This application claims the benefit of U.S. Provisional Application No. 61/523,020 filed on Aug. 12, 2011, entitled "The Mommy Cart."

BACKGROUND OF THE INVENTION

1. Field of the Invention

The present invention relates generally to a portable child-carrying shopping cart device and more specifically to a collapsible shopping cart capable of carrying more than one child. The cart has two seats for small children, a garment hanger and bag storage area, an extendable snack and beverage tray, and a collapsible shopping cart. Parents or caregivers who are accompanied by young children on shopping trips will appreciate these elements. The device provides a convenient and easily transportable means for shopping and maintaining control of children.

Young children are a delight to their parents and those around them. Yet the care of a child during the early years can be a time consuming and cumbersome process. At home, parents and caregivers can easily restrict the movements of a child and keep a watchful eye on it while activities are performed. Toys and childcare products can be neatly stored and accessed as necessary. As the child grows and becomes increasingly self-sufficient, parents are able to leave the child in a playpen, crib or play area, so that the parent can accomplish tasks around the house.

The situation becomes considerably more difficult when a parent or caregiver must leave the house to perform tasks. Children must be safely secured within the family vehicle, toys and childcare products packed into travel bags, and snacks and beverage containers prepared. Upon reaching an intended destination, the parent or caregiver must then collect the children and necessary bags before entering a store or other premises. This can be quite a handful when one child involved but quickly becomes unmanageable when multiple children are present. If the activity in question is shopping, the parent must juggle the children, their accouterment, and any items being purchased. Grocery carts and store shopping carts alleviate some of the problem by providing a child set and room to carry items. But, these carts rarely provide space to seat more than one child and generally lack sufficient cart volume to store the accompanying child bags in addition to groceries. Furthermore, not all stores offer shopping carts. For instance, outdoor markets rarely have such devices available for general use. An easily portable shopping cart is needed that is capable of carrying multiple children and their accouterments, so that parents on-the-go can bring their shopping cart with them when they run errands with their children.

2. Description of the Prior Art

The present invention provides a collapsible shopping cart that can accommodate two seated children. It is a single unit with a collapsible cart portion and a seating portion. Room for storing miscellaneous items and hanging coats is provided in the seating portion of the cart. An extendable tray with drink holders is attached to the seating portion to provide children with a place to store beverages and snacks while in the cart. The prior art does not disclose a collapsible shopping cart having either the structure or function of the present invention.

Currently known collapsible shopping carts are generally small, with few structural elements, to promote maximum compressibility of the cart. Carts made of plastic or metal mesh; with removably engagable frame parts are known in the art. An exemplary invention is shown in Smith, U.S. Pat. No. 6,328,329 which discloses a collapsible shopping cart having a rectangular lower frame with four attached wheels, a mesh basket, a handle, and several horizontal support bars. The support bars interlock to form a support frame for the mesh basket while the cart is in use. In its ready state the cart appears similar to a standard grocery cart. After a user is done with the cart, the basket and horizontal support bars may be collapsed against the lower frame for easy storage. Such shopping carts are intended to be highly compact in the stowed state and thus the expanded state does not accommodate seating of children, storage of coats and purses, or the holding of beverage containers. The present invention combines the structural elements necessary to provide these functions as well as an easily transportable, collapsible shopping cart.

Attachments for standard shopping carts address some of the needs of parents with small children, but do not disclose all of the structural elements of the present invention or provide the benefits of a collapsible cart. One such device is described in U.S. Patent Application Publication No. 2008/0018068, to Bartlett. Bartlett discloses a child carrier that is removably attachable to a shopping cart by means of quick-release latches on the bottom of the carrier. The carrier has a larger interior cavity that is accessible through doors on either side of the carrier. A bench is built into the interior cavity to allow a child to enter through the doors and sit down when the cart is in use. The child carrier further comprises a handle at the top, and wheels on the bottom. It is thus reminiscent of the cab of a small vehicle.

McKeevey, U.S. Pat. No. 6,525,180 and Conrad, U.S. Pat. No. 7,093,811 describe a child seat on wheels that are removably securable to a shopping cart. The carrier has a rectangular lower frame with four wheels and two wheel receiving wells disposed along the front of the lower frame. Rear wheels are of a standard grocery cart are placed within the two wheel wells of the carrier to removably couple the cart and carrier together. A vertical frame is secured at the rear of the lower frame and is secured to a seat for a child. The vertical frame includes four legs of the child seat and a small shelf lying therebetween for a caregiver to place items upon.

A similar device is disclosed by Doty, U.S. Pat. No. 5,312,122. The Doty device comprises a lower frame that removably secures to a standard shopping cart via two horizontal attachment bars, and two handle support bars. The handle support bars extend diagonally from the handle of the shopping cart to a vertical frame along the rear of the child carrier attachment. A child seat is disposed between the handle support bars and faces rearward. This permits two children to be seated, one in the grocery cart seat, and one in the child carrier seat. Covers for the handles of the shopping cart and device are provided in the form of trays having beverage container holders. Variations on the child carrier attachment include the use of bucket seating. U.S. Pat. No. 5,882,021 to Reiland et al discloses a grocery cart attachable child carrier. It comprises a semi-cylindrical plastic body with two handles disposed along the top, a plurality of wheels secured to the bottom and a grocery cart couple means attached to the bottom front. Two cylindrical portions are cutout of the front face of the child carrier to create two rounded bucket seats. Seat belts are included to removably secure two children into the bucket seats.

These devices all suffer from the same drawback in that they are not permanently connected to the shopping cart. A parent or caregiver is thus obligated to put their child on the ground or in the shopping cart while the parent attempts to couple the cart to the child carrier. Any objects the parent is carrying must also be placed on the ground while the coupling process takes place. This is not only extremely inconvenient but may be dangerous as well. Children may run off or collide with other shoppers/shopping carts if not watched carefully. The present invention solves this problem by providing an all-in-one shopping cart and child carrier that is easily transportable. A parent can set-up the shopping cart while children remain in the safety of their vehicle, then place the children in the cart seats. Shopping trips can commence without necessitating periods where the children are unattended.

A combination shopping cart and stroller is describes in Koppes et al, U.S. Pat. No. 6,679,506. This device has a shopping basket secured to a lower rectangular frame with 4 wheels. The top of the basket slopes downward towards the front, away from the handle disposed at the rear top of the device. A child set is secured at the front of the stroller-cart, in front of the basket. Alternatively, a baby's car seat/carrier may be secured to the front of the basket to facilitate carrying of very young children. Behind the basket is a set of small compartments that can be used for storage of purchased items in an alternate embodiment the main portion of the shopping cart can be reduced in volume and a second child seat placed behind the first, to permit two children to travel at the same time. Though Koppes does disclose a combination cart and stroller device, it does not describe the garment hanging cavity, extendable snack and drink tray, or the collapsible shopping cart portion of the present invention. The compressible shopping cart and child carrier described below provides greater functionality through significant structural variations from the Koppes device.

The present device provides a compressible shopping cart capable of carrying two children and their accompanying outerwear garments and travel bags. It substantially diverges in design elements from the prior art and consequently it is clear that there is a need in the art for an improvement to existing child-carrying shopping cart devices. In this regard the instant invention substantially fulfills these needs.

SUMMARY OF THE INVENTION

In view of the foregoing disadvantages inherent in the known types of portable child-carrying shopping carts now present in the prior art, the present invention provides a new collapsible shopping cart wherein the same can be utilized for providing convenience for the user when shopping with small children The present portable child-carrying shopping cart has a seating portion and a compressible shopping cart portion secured to the front of the seating portion. Wheels are secured to the bottom of each portion to facilitate movement of the device. The seating portion is an upstanding block-shaped member. A cutout at the top of the seating portion forms a shelf seat for two children. A handle is secured near the top and is positioned behind the shelf seat, creating a restraining bar that prevents children from falling forward. An extendable snack tray and beverage holder is secured near the handle and can be extended or retracted as needed. Below the shelf seat is a vertical cavity with two coat hangers, for hanging children's garments and storing purses, bags, or other items. These features provide parents with a sturdy means for seating two children and a convenient storage means for child related baggage and garments. It increases the ease of shopping with children, thereby reducing the parent's stress during the activity.

The shopping cart portion is collapsible for easy storage of the device. The material composition of the cart basket allows the front of the cart portion to be compressed against the front of the seating portion. The device may be used with the shopping cart in a stowed position, for simple transportation of children. The compact stowed state of the device makes it convenient to store in a garage or the backseat of a car, where it can be readily accessed for outings.

It is therefore an object of the present invention to provide a new and improved portable child-carrying shopping cart device that has all of the advantages of the prior art and none of the disadvantages.

It is another object of the present invention to provide a shopping cart that can safely accommodate the seating of two children.

Another object of the present invention is to provide a shopping cart that is compactible for easy transportation and storage.

Yet another object of the present invention is to provide a compactible shopping cart that is capable of carrying multiple children.

Still another object of the present invention is to provide a child transportation device with an extendable snack and beverage tray, so that children seated in the device can enjoy a snack while their parent or caregiver pushes the device.

A further object of the present invention is to provide a child transportation device having a storage cavity with garment hangers so that children's garments and baggage can be safely stored while the device is in use.

A still further object of the present invention is to provide a compressible shopping cart and child transportation device having resilient and durable construction that can withstand use by small children.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

Figure 3:
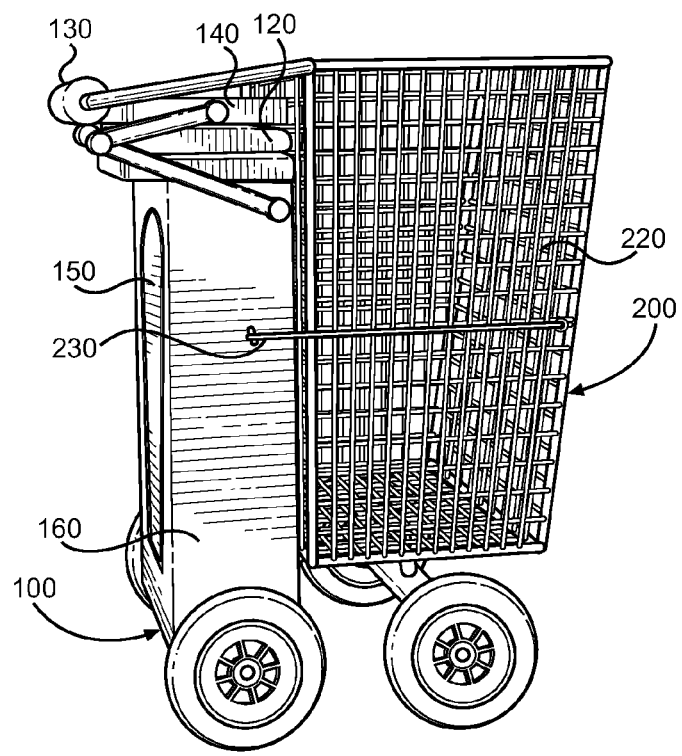

FIG. 3 shows a side view of the cart in a stowed state. The cart basket is compressed and removably secured to the seating portion of the cart. The extendable snack tray is folded up into the seat area while the device is not in use.

DETAILED DESCRIPTION OF THE INVENTION

Reference is made herein to the attached drawings. Like reference numerals are used throughout the drawings to depict like or similar elements of the portable child-carrying shopping cart. For the purposes of presenting a brief and clear description of the present invention, the preferred embodiment will be discussed as used for transporting small children and their luggage while shopping. The figures are intended for representative purposes only and should not be considered to be limiting in any respect.

Figure 1:
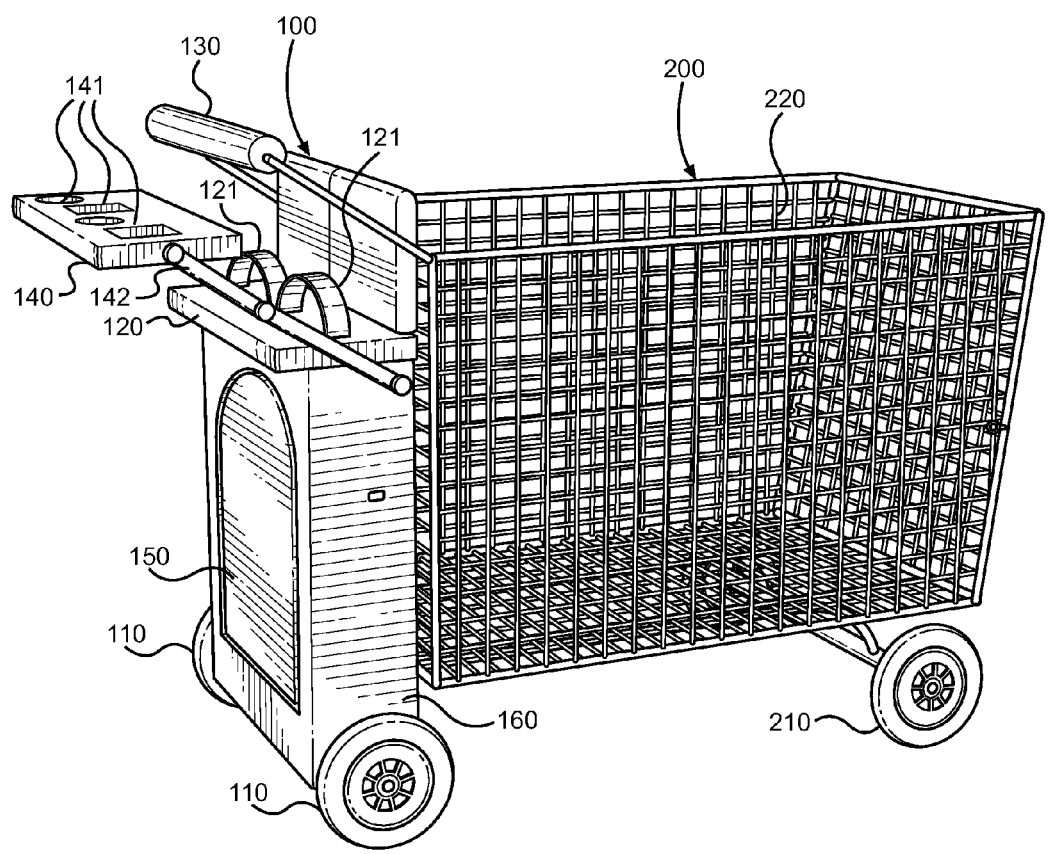
FIG. 1 shows a perspective view of the cart in a ready-for-use state with the cart basket fully extended.

Referring now to FIG. 1, there is shown a portable child-carrying shopping cart in a deployed state. The device has a seating portion 100 and a cart portion 200. Both portions are supported by a pair of wheels 110, 210 to facilitate uniform movement of the device. The body 160 of the cart has a somewhat rectangular or blocky shape and a primarily vertical orientation. A shelf seat 120 is formed from a cutout portion of the upper part of the body and has sufficient room to seat two small children. To restrict the movements of children on the shelf seat, s pair of seat belts 1121 is secured to the shelf seat. Seatbelts are positioned side-by-side so that children are seated beside each other, where parents can keep a watchful eye on both children.

A handlebar 130 is secured to laterally opposing sides of the body of the seating portion. Rubber or other soft durable material may be used to coat the handlebar, creating an easily graspable, and non-slip surface for a parent to use when pushing the device. The handlebar may be pivotable to permit rotation in an upward and downward fashion. This can make it easier to place a child in the seat as the bar can be raised over the child's head and then lowered after the child is in position. Whether the handlebar is secured via pivoting means or not, it serves as a restraining bar to prevent children from falling forward out of the seat. Below the handlebar, an extendable snack tray 141 is disposed. The tray is secured with two arms 142 to opposing sides of the body, preferably below or behind the shelf seat. The arms may be hinged to allow the snack tray to collapse into the shelf seat for storage (see FIG. 3) or may be a single rigid bar. Like the handlebar, the snack tray arms may be pivotably secured to the body to permit upward and downward rotation. The tray itself may also rotate 360 degrees to reduce the difficulty of placing children on the shelf seat. Once a child is in place the tray can be moved upward or downward and rotated as necessary. Beverage containers and snacks can be placed within the snack holders 141 disposed along the surface of the snack tray. This will be a great benefit to parents because the children have ready access to their beverages and food, leaving the parent to shop with less distraction.

Figure 2:
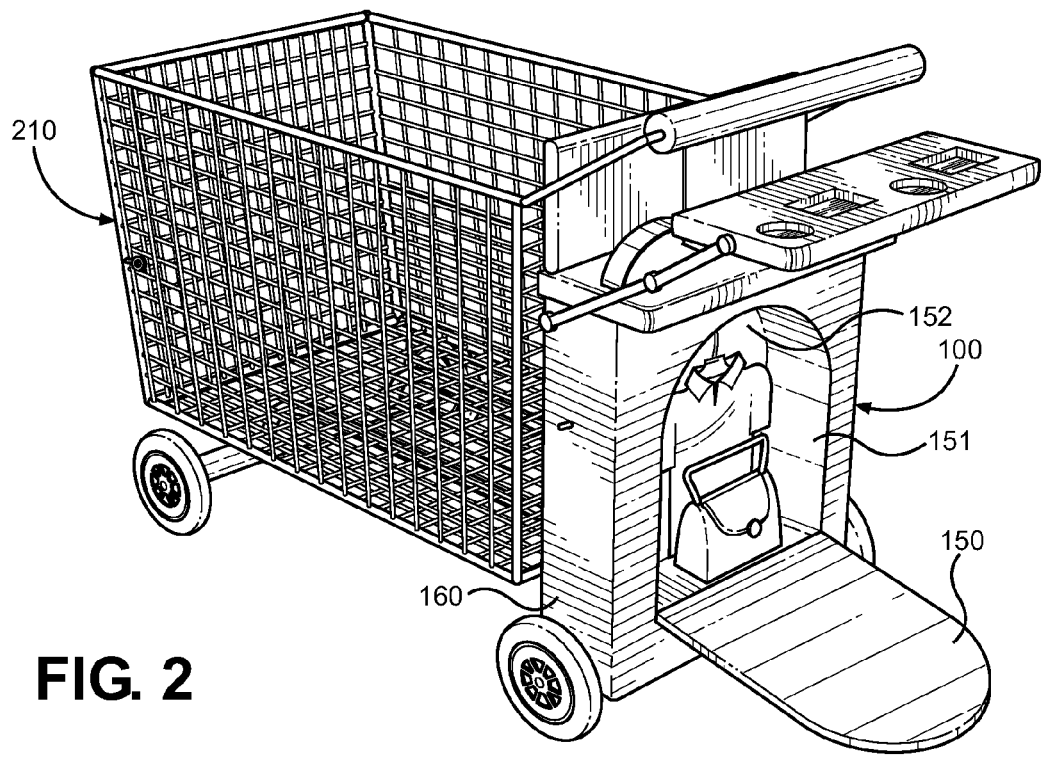
FIG. 2 shows a perspective view of the rear of the cart. The interior storage door is open so that the interior cavity is displayed within items placed therein.

The rear face of the device body contains a storage cavity with a hinged storage door 150. When the door is closed items in placed in the cavity are prevented from falling out of the body. The cavity provides a space for parents to store a variety of items while the shopping cart is in use, freeing up space in the cart basket 220 to place groceries, clothing, or any other items for purchase. A rear perspective view of the device is shown in FIG. 2, with the cart portion 200 in a deployed state and the storage door open. The door can hinge along any side but is shown hinged along the bottom so that it opens downward. An interior cavity 151 disposed in the device body 160. Clothing such as children's coats and sweaters may be hung on the clothing hooks 152 disposed along the top of the interior cavity. The bottom of the cavity provides a shelf for purses, diaper bags, or other children's luggage to be stored. Any geometrical figure may be used to form the shape of the cavity. The shape used may vary according to the size and intended use of the shopping cart device.

Turning now to FIG. 3, the shopping cart device is shown in a stowed state. The handlebar 130 is rotated downward and the snack tray 140 is folded up into the shelf seat 120 area. In a preferred embodiment, shown in the figure, the back of the shelf seat can be folded downward onto the bottom of the seat. Alternative embodiments provide a fixed shelf seat back. The figure also shows the storage door 150 in a closed position.

Hence, the storage door, shelf seat back, handlebar, and snack tray all collapse in towards the device body 160 for storage and easy transportation.

The cart portion 200 is compressible and collapses backward towards the seating portion 100 when the cart is ready to be stored. When collapsed, the cart basket 220 is removably secured to the seating portion with a cart securing means 230 such as a string, wire, or elastic band. Small hooks, or the like are disposed on the sides of the seating portion to provide a point of securement. The intended use of the portable shopping cart will determine the shape and construction of the cart basket. The basket may have four walls and a bottom, defining an interior storage space, or alternatively may have a semi-circular shape. Other geometric figures may also be used. Materials such as fabric, mesh, metal links, and rope baskets may be used. Some activities will necessitate a stronger more rugged type of cart basket, while other activities may require only a simple storage means. Users can weigh the desire for a lightweight device over the need for durable storage while shopping, when making the choice of what type of cart to purchase. All models of the device will have collapsible cart baskets and cart securing means. This allows the cart to be easily wheeled too and from a vehicle, and placed therein for transportation. It may also be used with the cart basket in the stowed state, if a parent simply desires to transport their children and bags to a location.

In use an individual removes the stowed shopping cart from their vehicle and places it on the ground. The storage door is opened and the parent places his or her bag in the interior cavity. Children's coats are hung on the clothing hooks and the storage door is closed to prevent items from falling out. The parent then lifts the handlebar upward and pulls the snack tray out of its stowed position and downward, so these features will not be in the way of children. Then the shelf seat back is lifted up and into a vertical position. Seatbelts of the shelf seat are then unbuckled so that the shelf seat is ready for placement of a child. Children are then placed on the shelf seat and buckled in. The handlebar is lowered so that it rests in front of the children. Likewise, the snack tray is raised until it is in a horizontal position in front of the children. Snacks and beverage containers are loaded into the snack containers on the tray. The parent may then push on the handlebar to accelerate forward towards a destination. Upon reaching a store, the parent unfastens the cart securing means and extends the collapsible cart basket into its extended position. The cart is now ready for use as a shopping cart. After shopping is over, the parent simply reverses the process to place the cart in a stowed state and places the device back in the vehicle.

The invention is thus a portable shopping cart adapted for carrying children and their associated luggage. The device can comfortably seat two children and provides seat belts, and a handlebar to reduce the risk that children will fall off the cart. An extendable snack tray is included d that is positionable near the handlebar so that children may have ready access to their drinks and snacks, giving a parent less to keep track of. Children's garments and bags may be stored in the interior cavity below the shelf seat. The cart basket is secured to the seating portion of the device and is collapsible. It may be extended for use by pulling the basket away from the seating portion. The device therefore seeks to provide an all inclusive and easy to transport shopping cart that can accommodate the needs of parents with multiple young children. It provides not only safe seating of children but storage of child related items and shopping items as well. It is also compactible and can be stored in a vehicle or garage when not in use.

Though no specific material is contemplated for the construction of the device it should be noted that easy of portability is a desired benefit. Lightweight, durable plastics are ideal construction material for the seating portion, but other materials may be used as well. Such construction will be known to one of ordinary skill in the art of shopping carts and strollers.

To this point, the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable, child-carrying shopping cart, comprising:
   a seating portion having a front and rear face, and a plurality of wheels disposed along a bottom portion of said seating portion;
   a cart portion having a collapsible cart basket with a bottom, and at least one wall defining an interior space, and a plurality of wheels secured to said bottom of said cart basket;
   a pair of seats disposed near said top of said rear face of said seating portion;
   a handlebar connected to and extending from the cart portion;
   a snack tray connected to and extending from the seating portion;
   and an interior cavity disposed along said rear face of said seating portion.

2. The device of claim 1, wherein said pair of seats comprises a shelf seat having a bottom seat portion and a back portion.

3. The device of claim 2, wherein said back portion is hingedly secured to said bottom portion.

4. The device of claim 1, wherein said pair of seats has a pair of adjustable seatbelts.

5. The device of claim 1, wherein said handlebar is secured to opposing sides of said seating portion near said top.

6. The device of claim 5, wherein said handlebar is pivotably secured to said seating portion.

7. The device of claim 1, wherein said snack tray is secured to opposing sides of said seating portion with two arms.

8. The device of claim 7, wherein said arms are pivotably secured to said seating portion.

9. The device of claim 7, where said arms are pivotably secured to said snack tray.

10. The device of claim 7, wherein said arms each comprise two bars, hingedly secured to each other.

11. The device of claim 1, wherein said interior cavity has a garment hanger extending downward from an upper portion of said interior cavity.

12. The device of claim 1, further comprising:
    a storage door, adapted to cover said interior cavity when closed.

13. The device of claim 12, wherein said storage door is hingedly secured to a side of said interior cavity.

14. The device of claim 1, further comprising a securing means that wraps around said cart basket in a compressed state and engages with a hook disposed along a side of said seating portion.

* * * * *